United States Patent [19]

Cole

[11] Patent Number: 4,869,520
[45] Date of Patent: Sep. 26, 1989

[54] MULTIPURPOSE HOOK-ON PLATFORM

[76] Inventor: Glen A. Cole, 6382 Lucky John Rd., Paradise, Calif. 95969

[21] Appl. No.: 235,320

[22] Filed: Aug. 22, 1988

[51] Int. Cl.$^4$ .............................................. B60R 3/00
[52] U.S. Cl. ................................. 280/164.1; 280/169; 182/92; 182/127; 182/206; 293/117; 403/107
[58] Field of Search ............ 280/163, 169, 291, 164.1, 280/166; 182/53, 54, 55, 56, 57, 58, 59, 90, 91, 92, 121, 122, 46, 127, 206, 222; 403/107, 108; 293/117

[56] References Cited

U.S. PATENT DOCUMENTS

| | | | |
|---|---|---|---|
| 852,172 | 4/1907 | Eschholz et al. | 182/56 |
| 1,009,056 | 11/1911 | Eastman | 182/58 X |
| 1,036,482 | 8/1912 | Fredeen | 182/206 |
| 1,430,687 | 10/1922 | Schabhuettl | 182/46 X |
| 1,534,895 | 4/1925 | Blackwood | 182/58 |
| 2,779,525 | 1/1957 | Vogel | 280/163 X |
| 2,870,820 | 1/1959 | Turnipseed | 280/163 X |
| 3,159,242 | 12/1964 | James | 182/92 |
| 3,260,522 | 7/1966 | White et al. | 182/46 x |
| 4,057,125 | 11/1977 | Kroft | 182/91 |
| 4,089,276 | 5/1978 | Enos | 182/92 X |
| 4,405,141 | 9/1983 | Jurek | 280/163 |
| 4,601,364 | 7/1986 | York | 182/46 X |
| 4,605,098 | 8/1986 | Leuty | 182/92 |
| 4,620,609 | 11/1986 | Elsten | 182/92 |
| 4,751,982 | 6/1988 | Wolfe | 182/206 X |
| 4,753,447 | 6/1988 | Hall | 280/163 |

FOREIGN PATENT DOCUMENTS 2463529 3/1981 France ................................ 182/46

Primary Examiner—Charles A. Marmor
Assistant Examiner—Brian L. Johnson

[57] ABSTRACT

A hook-on adjustable step and cargo platform for vehicles comprised of an upper rectangular load supporting platform member or step, two adjustable triangular support braces, and two readily interchangeable rectangular hooks. Each triangular support brace is adjustably retained in a parallel lengthwise channel on the bottom surface of the platform member. When the platform is in-use, one vertical surface of each triangular brace rest against the front of a vehicle bumper. The triangular braces can be readily adjusted forward or rearward in relative position to the two hooks. The two hooks are removably affixed to the front end of the platform member facing the bumper, one directly in front of each of the triangular braces, positioned to be hooked-over the back edge of the top surface of the bumper. The hooks are available in a variety of shapes, sizes, a lengths to accommodate a variety of styles and thicknesses of materials used in manufacturing bumpers. The hook-on platform can also be used as a tire chock for preventing the vehicle from rolling.

2 Claims, 8 Drawing Sheets

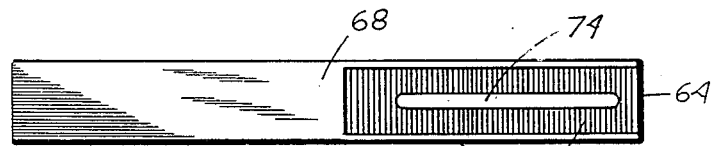
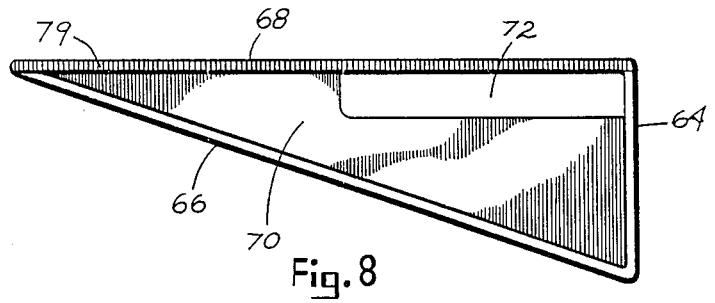
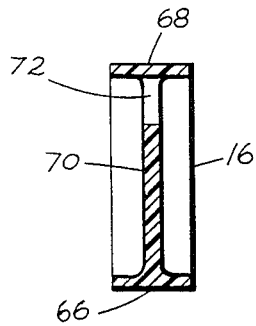
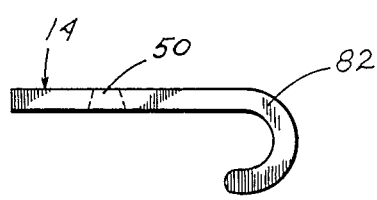
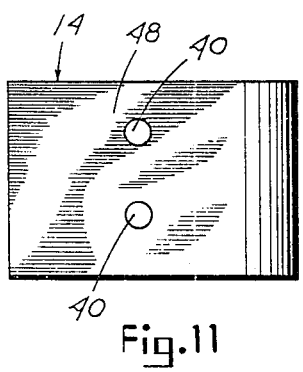
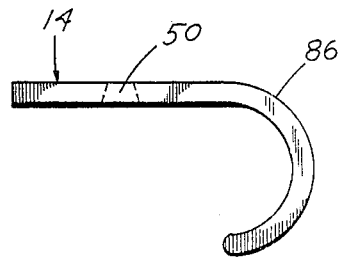

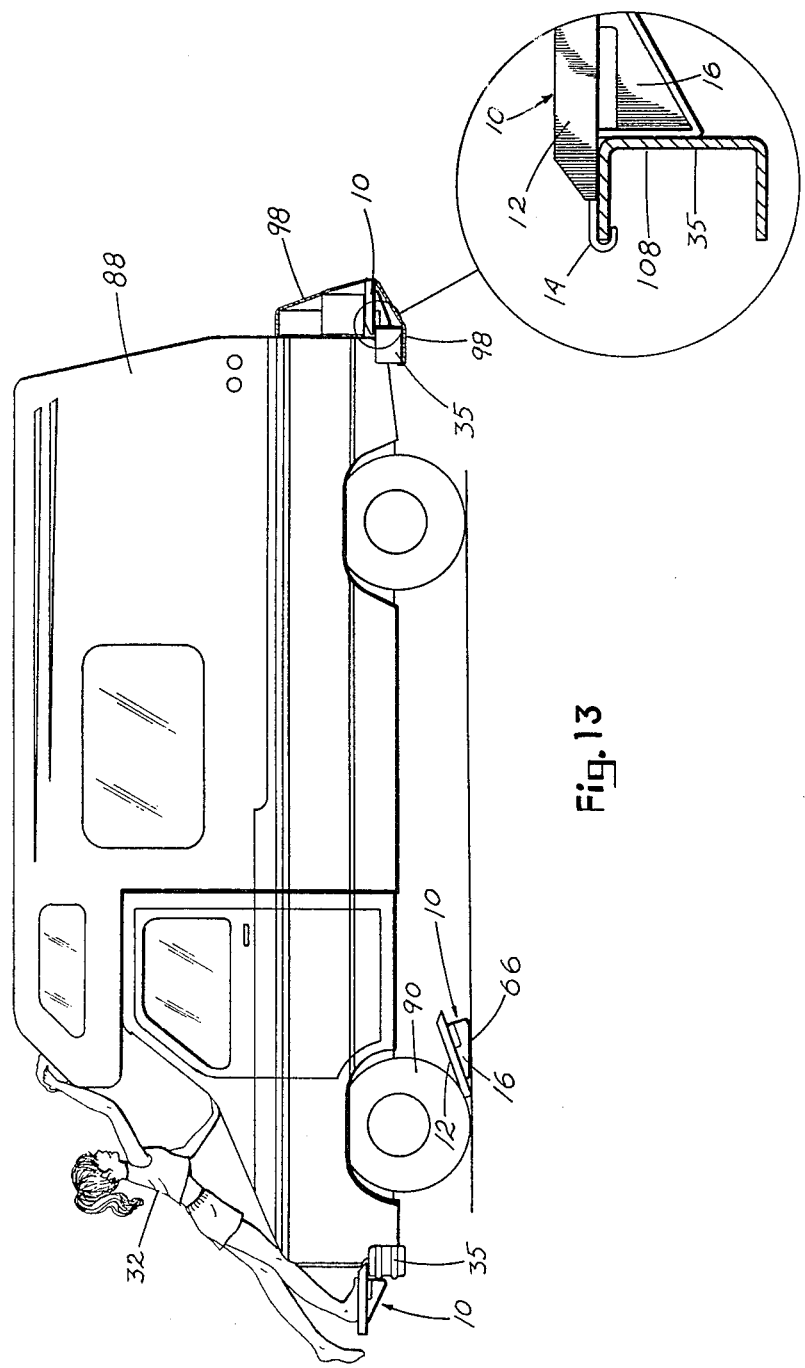

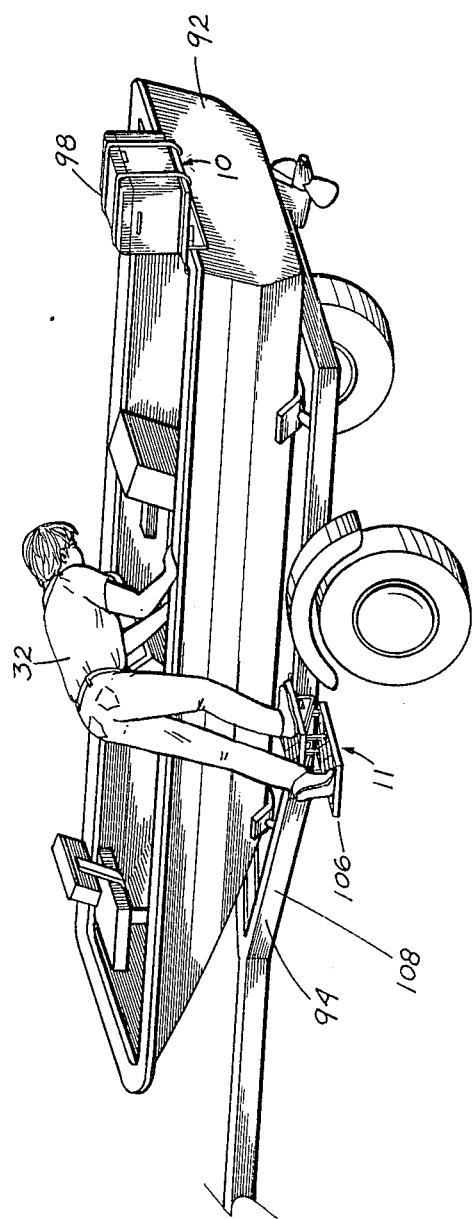

MULTIPURPOSE HOOK-ON PLATFORM

BACKGROUND OF THE INVENTION

1. Field of the Invention

This invention in general relates to temporary hookon steps and cargo platforms and more precisely to an adjustable multipurpose platform designed to be temporarily mounted on the bumpers of vehicles and other similar support structures for use as a step or cargo carrier.

2. Description of the Prior Art

Many large trucks, vans, and motor homes are designed with a higher profile than that of conventional passenger vehicles. This added height makes servicing certain upper portions of the vehicle difficult and sometimes dangerous. For tasks such as window washing or minor engine work on these high vehicles a step ladder can be used when one is available. However, a ladder is not always available, especially when such tasks need to be preformed on the road. Under such conditions a person must lean over the grill and balance on the narrow ledge of the bumper to reach the otherwise inaccessible areas.

A number of small easily stored bumper steps have been invented to resolve the foregoing problem. A search was therefore conducted to produce those patented past art vehicle bumper steps and platforms. Of the past art patented devices examined, the following were considered most pertinent to my invention:

1. The patent issued to Hall on June 28, 1988, U.S. Pat. No. 4,753,447, shows a temporary adjustable bumper step.

2. Leuty was granted U.S. Pat. No. 4,605,098, on Aug. 12, 1986, for a "Truck Bumper Step".

3. On Nov. 4, 1986, Elsten was issued U.S. Pat. No. 4,620,609, for a removable bumper step for vehicles.

4. U.S. Pat. No. 4,405,141, was granted to Jurek, on Sept. 20, 1983, for servicing steps to be mounted on the bumper of a truck.

5. Kroft was granted U.S. Pat. No. 4,057,125, on Nov. 8, 1977, for "Bumper-Mounted Truck Servicing Platform".

6. On Dec. 1, 1964, James was issued U.S. Pat. No. 3,159,242, for a "Detachable Bumper Step".

The Hall, Leuty and Jurek patents disclose bumper steps having a horizontal support surface level with the lower edge of the bumper. This structure of step often proves to provide insufficient height compared to a step whic his level with or above the top edge of the bumper. Several U.S. Pat. Nos. 4,405,141, 4,057,125, and 3,159,242, are not readily adjustable for accommodating variations in the width of the upper edge of the bumper. They provide no means for adjusting the distance between the bumper hooking means and the vertical support walls of the braces.

U.S. Pat. No. 4,620,609 and all the other past art devices fail to provide readily interchangeable hooks or bumper attachment apparatuses to accommodate different shapes and thicknesses in material of bumpers. The type of structuring used in the past art devices tends to limit their use to certain styles of bumpers which prohibits their use on other forms of platform support structures where steps might be used. Permanently affixed hooks necessarily requrie the entire step or major portion of it to be manufactured for certain specific bumpers. This not only increases production costs by requiring the use of several different large dies or stamps in the manufacturing process, but the storage of a number of different styles or sizes of the steps within warehouses or retail outlets would increase substantially.

My hook-on platform overcomes the previously mentioned disadvantages of the past art devices, and provides other new and useful benefits which are described in detail in the following specification.

SUMMARY OF THE INVENTION

In practicing my invention, I have developed a multipurpose hook-on platform comprised of an upper rectangular oad supporting platform member or step, two adjustable triangular support braces, and two readily interchangeable rectangular hooks. Each triangular support brace is adjustably retained in a parallel lengthwise channel on the bottom surface of the platform member. When the platform is in use, one vertical surface of each triangular brace rests against the front of the bumper. The triangular braces can be readily adjusted forward or rearward in relative position to the two hooks. The two hooks are removably affixed to the front end of the platform member facing the bumper, one directly in front of each of the triangular braces, positioned to be hooked-over the back edge of the top surface of the bumper. The hooks are available in a variety of shapes, sizes, and lengths to accomomdate most styles and thicknesses of materials used in manufacturing bumpers. Once the hook-on platform is mounted, the top surface of the platform member is slightly above the top of the bumper providing the user with a sturdy standing platform. The interchangeable hooks and adjustable support braces of the invention allows my hook-on platform to be more versatile than existing bumper steps by being adaptable to fit a wide variety of shapes of bumpers and other platform support structures.

Because of the wide range of adjustability of my attach mentmeans, the user can easily arrange the hook-on platform to attach to raised platform support structures other than bumpers, such as boat transoms or boat hauling trailers, and building framing members. By attaching a hook-on platform to a boat transom, the user can position an ice chest or fishing tackle box in a more convenient out of the way location. By hooking it over a boat hauling trailer the user can better reach into the boat to load and unload equipment before and after an outing. When attached to the rear bumper of a vehicle and used in conjunction with elastic cords or other cargo tie-down straps, the hook-on platform can be used for carrying small amounts of cargo. The shape of my hook-on platform with attached adjustable triangular braces also makes the device well suited for use as a wheel chock.

The main body of the invention is made of strong lightweight plastic efficiently formed in an injection molding process while the two hooks are made of strong stainless steel.

Therefore, it is a primary object of my invention to provide a readily removable hook-on platform designed as a bumper step for supporting the weight of a human.

A further object of my invention is to provide a hook-on platform which is readily adjustable for hook-over attachment to a wide variety of bumper and other raised platform support structures.

A still further object of my invention is to provide a readily removable hook-on platform which mounts securely, and is strong and lightweight.

Other objects and advantages of my invention will become apparent with a comparison of the numbered parts shown in the drawings, with the following description of the preferred embodiment.

BRIEF DESCRIPTION OF THE DRAWINGS

FIG. 7 is a top view of one triangular support brace.

FIG. 8 is a right side view of one trinagular support brace.

FIG. 9 is a frontal cross-section view of one triangular support brace showing the I-beam structure.

FIG. 10 is a right side view of an enlargement of one style of the attachment hook.

FIG. 11 is a top plan view thereof showing two bolt apertures for bolting the hook to the platform member.

FIG. 12 is a right side view of an enlargement of another style of platform attachment hook having a large hook structure.

FIG. 13 is an illustration of three hook-on platforms in use. One is shown attached to the front bumper supporting a person, the second is shown attached to the rear bumper supporting cargo, and the third platform is shown positioned beneath the front wheel serving as a tire chock. The enlargement of the rear bumper and affixed platform illustrates the in-use attachment position of the hooks and triangular braces.

FIG. 16 is an in-use illustration of both the first and second embodiments of the invention. The first embodiment is shown being used as a cargo carrier hooked-over the transom of a boat and supporting an ice chest. The second embodiment is shown being used as a step hooked-over the channel iron framing of the boat trailer.

DESCRIPTION OF THE PREFERRED EMBODIMENTS

Figure 1:
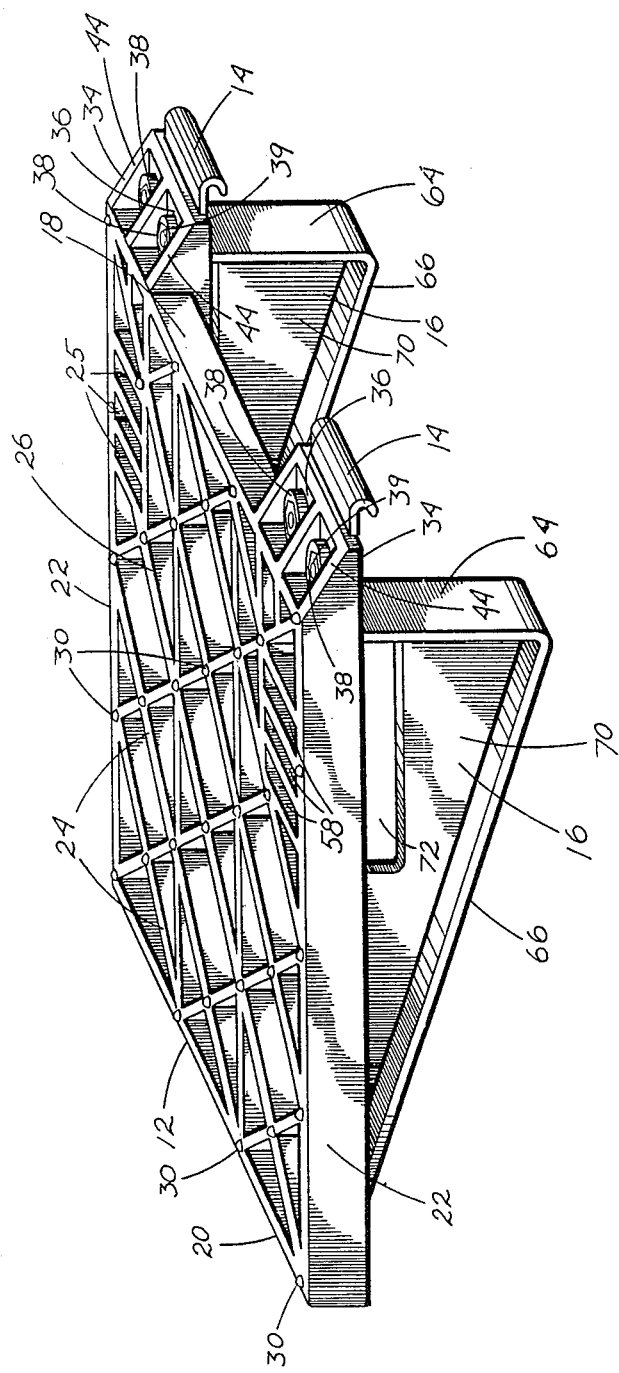
FIG. 1 is a perspective assembled view of the first embodiment of the invention.
Figure 2:
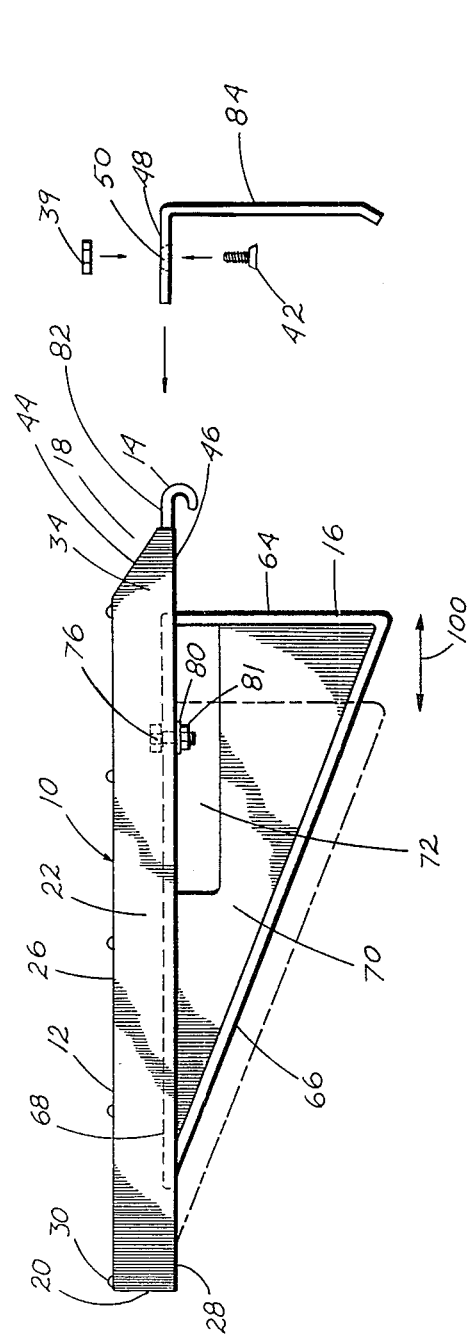
FIG. 2 is a right side view thereof, with one style of hook shown to the far right of the first embodiment positioned for replacement with a smaller hook style.
Figure 3:
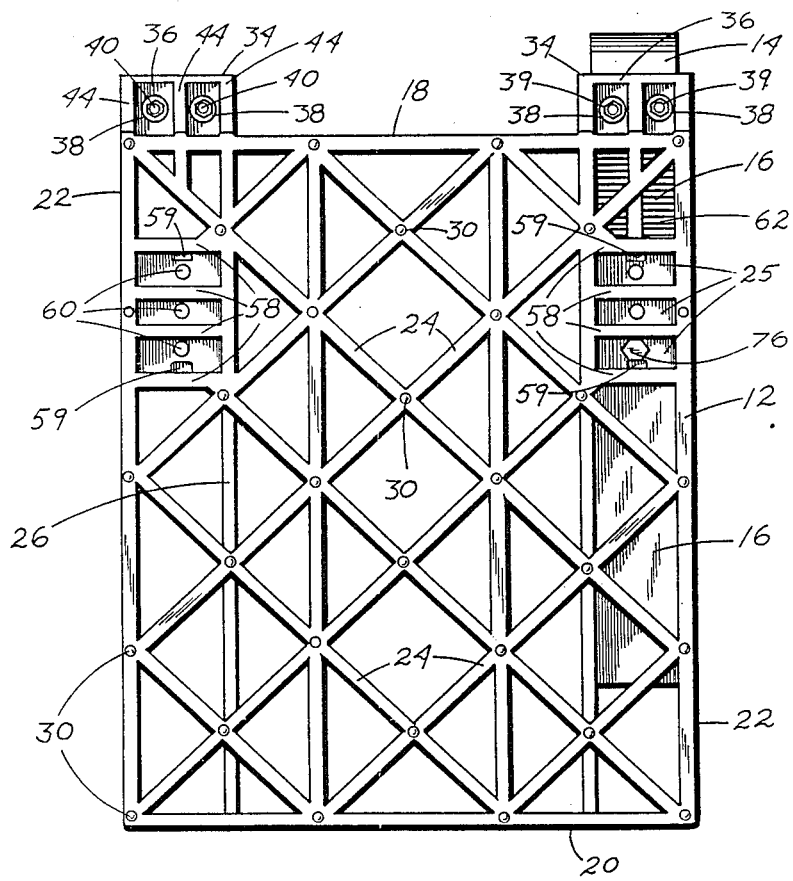
FIG. 3 is a top view of the first embodiment showing the platform member with one support brace and one platform attachment hook affixed on the right.
Figure 4:
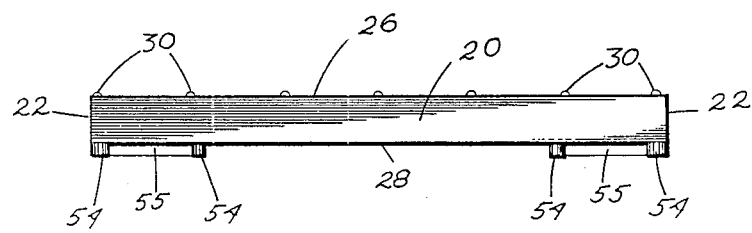
FIG. 4 is a rear view of the platform member showing retaining channels for the triangular support braces on the underside edges. The support braces are not shown.

Referring now to the drawings in general and to FIG. 1 where first embodiment 10 of the invention is illustrated in a perspective assembled view. The following components are described in their relative in-use positions. First embodiment 10 is comprised of a substantially rectangular horizontal upper load supporting platform member 12, two attachment hooks 14, and two triangular braces 16. Platform member 12 is structured of a frame having one front end panel 18, being the end facing bumper 35, one back end panel 20, and two side panels 22 with all panels being substantially vertical. The interior of platform member 12 is formed with open grating 24, best seen in FIG. 3 and 5. Grating 24 is designed to reduce both the weight of the device and manufacturing costs by decreasing the amount of plastic required to produce the part. Grating 24 also inhibits puddling of water due to the opened weave design. Top surface 26 of platform member 12, shown in FIG. 3, serves as the load supporting surface above bottom surface 28 shown in FIG. 5. Top surface 26 has small rounded non-slip knobs 30 extending upward from grating 24, serving to provide greater traction to prevent slipping of user 32. Extending forward from front end 18, adjacent side panels 22 of platform member 12, are two hook attachment brackets 34, best seen in FIG. 2, 3 and 5. Hook attachment brackets 34 are substantially rectangular extensions of front end 18 structured to releasably retain and support hooks 14. Each hook attachment bracket 34 is structured with a horizontal flat base 36 projecting from the lower edge of front end panel 18. On the upper surface of flat base 36 are two hexagonal shaped nut housings 38, opened upward and sized to receive and prohibit spinning of one hex nut 39. A central vertical bolt aperture 40, located through each nut housing 38 and flat base 36, is sized to receive the shank of one flathead bolt 42. Positioned between and on either side of nut housings 38 on the upper surface of each hook attachment bracket 34 are three vertical side walls, angled support ribs 44. Angled support ribs 44 extend horizontally off front end 18 and vertically up from flat base 36 where they provide added strength to hook attachment brackets 34. On the underside of flat base 36, on each to the two edgeward sides, are parallel ridges 46, and one transverse ridge 46 adjacent front end panel 18. The three ridgs 46 form an opened front hook recess 47 for hook 14, shown in FIG. 5 and 6. Hooks 14 are manufactured of stainless steel or other comparable material of sufficient strength to withstand the applied stresses of loading the platform member 12 with at least the weight of one large man. All styles of hooks 14 are structured with a horizontal rectangular mounting plate 48 sized to fit between and flush with ridges 46. The opposite end of hooks 14 are downwardly curved and serve as the support structure for hook-on attachment to the top rear edge of bumper 35. Hooks 14 are provided with a variety of shapes and sizes of downwardly curved front ends to accommodate differences in bumper 35 styles, as shown in FIG. 2, 10 and 11. Through each rectangular mounting plate 48 of hooks 14 are two countersunk bolt apertures 50, structured to receive flathead bolts 42 with the bolt head flush with the underside of mounting plate 48. Flathead bolts 42, as shown in FIG. 2, are allen wrench drive, but can be substituted for other styles of flathead bolts. To mount hooks 14, rectangular mounting plate 48 is fully inserted between ridges 46 which automatically aligns countersunk bolt apertures 50 with bolt apertures 40 of hook attachment bracket 34. Flathead bolts 42 are inserted from the underside of hook 14 through both apertures 40 and 50 where flathead bolts 42 are secured by hex nuts 39 in nut housings 38.

Figure 5:
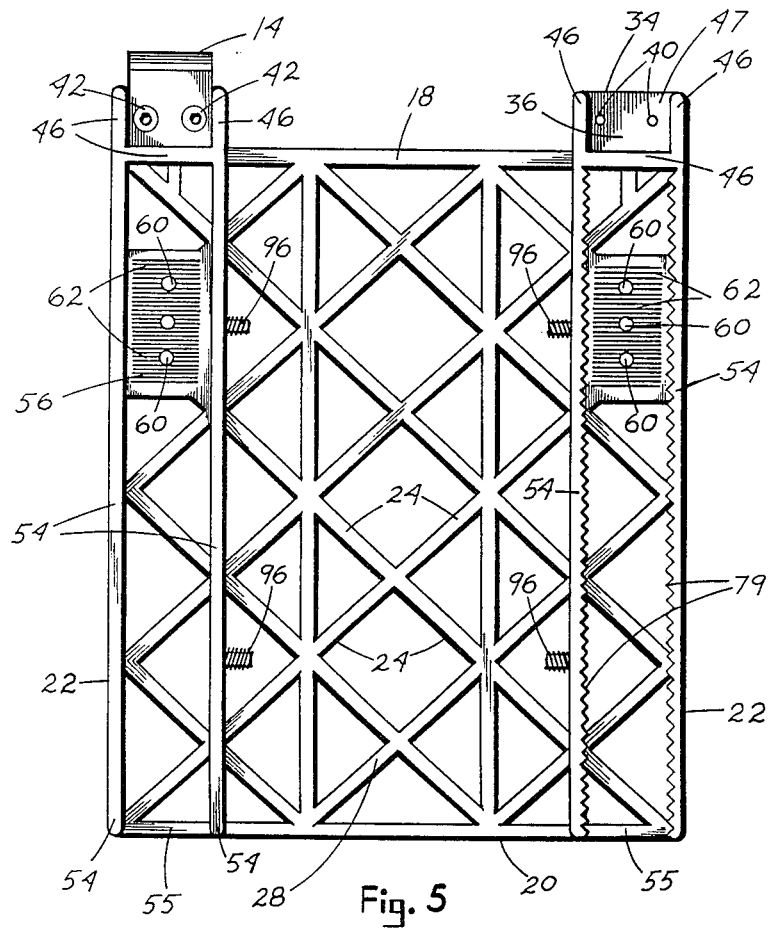
FIG. 5 is a bottom view of the platform member with the right attachment hook affixed. Also shown are four threades studs in the interior of the grated load support platform. The threaded studs are used in a second embodiment to attach a second or lower load support platform member.
Figure 6:
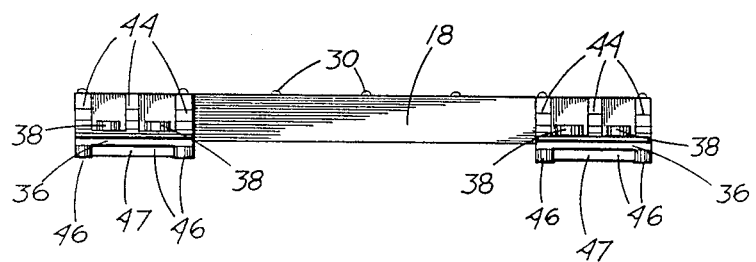
FIG. 6 is a frontal view of the platform member with the hooks and triangular braces removed.

Bottom surface 28 of platform member 12, shown in FIG. 5, has two parallel sets of brace retaining ridges 54. One set of brace retaining ridges 54 is located adjacent and parallel to each side 22, extending horizontally from back end panel 20 to front end panel 18 forming brace retaining channels 55. The two outer brace retaining ridges 54 are positioned directly beneath sides 22 and form a downward extension thereof. The two inner brace retaining ridges 54 extend downward from grating 24. Located in bottom surface 28 toward front end 18 in each brace retaining channel 55 is a short horizontal rectangular brace attachment plate 56. The lowermost surface of brace attachment plate 56 is approximately flush wth grating 24 and upward of the lowermost surfaces of brace retaining ridges 54 as shown in FIG. 5. Above the upper surface of brace attachment plate 56, in grating 24 of top surface 26 are three rectangular opened top recessed compartments 25 separated from each other and grating 24 by spaced vertical walls, dividers 58. The floor of each compartment 25, the upper surface of brace attachment plate 56, contains a vertical aperture, hex head bolt aperture 60. The two outer compartments 25 contain stationary blocks 59 which serve to prevent the rotation of hex head bolt 76 and eliminate the need for a wrench to secure the head of hex nut 39 during attachment. The inner compartments 25 created by dividers 58 of each brace attachment plate 56 are sized sufficiently narrow to prevent the rotation of hex had bolt 76. The bottom surface of brace attachment plate 56 is transversed with V-shaped horizontal locking serrations 62.

Triangular brace 16, shown in FIG. 7, 8 and 9, is a substantially triangular frame formed of three rectangular elongated panels affixed endwardly into a right triangle. Triangular braces 16 attach to platform member 12 with the hypotenuse of the triangle, angled bottom surface 66, positioioned downward, one short leg of the triangle, vertical support surface 64, positioned vertically toward front end panel 18, and one longer upward leg, horizontal top attachment surface 68, being parallel with platform member 12. The 90 degree corner of the triangle is upward and positioned toward front end panel 18 of platform member 12. All three panels encompass one centrally positioned brace support wall 70. Shown in a cross-sectioned end view in FIG. 9, brace support wall 70 and the surrounding edge panels of triangular braces 16 form an I-beam structure. A rectangular opening in the right-angle upper corner of brace support wall 70 forms nut access aperture 72. Positioned centrally longitudinally directly above nut access aperture 72, through top attachment surface 68, is bolt slot 74. Bolt slot 74 is an elongated opening sized to receive the shank portion of hex head bolt 76. Nut access aperture 72 is structured to allow sufficient area to connect hex nut 39 and washer 80 to the threaded shank of hex head bolt 76 for assembly and disassembly. Approximately one half of the forward end of top attachment surface 68 of each triangular brace 16 is transversed with horizontal locking serrations 62 positioned for interlocking juncture with horizontal locking serration 62 of brace attachment plate 56. Top attachment surface 68 is sized to be inserted into brace retaining channels 55 where bolt slot 74 is aligned under at least one hex head bolt aperture 60 located on brace attachment plate 56 of platform member 12. The threaded shank of hex head bolt 76 is inserted down through on hex head bolt aperture 60 through bolt slot 74 and secured in position with washer 80 and nut 81. Two bolts 76 through two bolt aperture 60 may be used on each side to increase the strength of the atachment if desired.

In FIG. 5 the right brace retaining channel 55 is shown having vertical locking serrations 70 on the interfaced edges of brace retaining ridges 55. These vertical serrations 79 are structured to cooperatively operate with the vertical locking serrations 79 shown on the vertical sides of top attachment surface 68 of triangular brace 16, shown in FIG. 8. Vertical locking serrations 79 are a manufacturing option which can be used in conjunction with or as an alternative to the horizontal locking serration 62.

In use, assembled first embodiment 10 is positioned with front end 18 facing bumper 35. Platform attachment hooks 14 are positioned over the back edge of the top surface of bumper 35 or other similarly structured platform support member 108, as shown in FIG. 13. Vertical support surface 64 of triangular braces 16 rest against the front surface of bumper 35 supporting platform member 12 horizontally. If bumper 35 is either too narrow or too wide causing platform member 12 to sit angled, triangular braces 16 can be positioned forward or rearward by loosening hex head bolt 76 sufficiently to disengage locking serration 62 or 79 to reposition triangular braces 16 relative to hooks 14 as shown with directional arrows 100 in FIG. 2. By moving hex head bolt 76 forward or rearward in the three compartment 25 even greater adjustment of triangular braces 16 can be achieved before hex head bolt abut the end of bolt slot 74. Horizontal locking serrations 62 engage with each other to prevent undesired rearward shifting of triangular braces 16 within brace retaining channels 55 when under load as indicated by directional arrow 100 in FIG. 2.

Should the rear edge of the top surface of bumper 35 be structured with a downward angled flange, curve, or be manufactured of very thick material, several different sizes and shaped of platform attachment hooks 14 are available to accommodate any style of bumper. Hooks 14 are a small part of embodiment 10 and can be manufactured, sold, packaged, and displayed inexpensively relative to the whole structure. Hook style 82, shown in FIG. 1 and 10, is designed for bumpers 35 which terminate in a straight narrow edge. Hook style 84, shown in FIG. 2, illustrates a shape of hooks 14 which usually works well for boat transom. Hook style 86 shown in FIG. 12 is an enlargement of hook style 82, and is provided as an example of one of the many sizes of the curved ends available.

First embodiment 10 is primarily designed be used as a step as seen on the front of vehicle 88 in FIG. 13. However, it is also suitable to be used as a support platform for ice chests and other articles as shown on the rear bumper 35 in the same view and in FIG. 16. First embodiment 10 can also be attached to buses, trucks, boat trailers 94 or conceivably any suitable platform support member 108 where a removable step or cargo platform is needed. When first embodiment 10 is utilized as a cargo platform, cargo tie-down straps 98, shown in FIG. 13, should be used over the cargo to secure the load and also under first embodiment 10 to prevent back end 20 from flying up when vehicle 88 is in motion. As an additional use, first embodiment 10 has been found to work very well as a chock for bracking tires 90. In FIG. 13, first embodiment 10 is shown with the angled bottom surface 66 of Triangular braces 16 horizontal on the ground, poisitioning platform member 12 angled behind tire 90 to serve as a chock.

Although not shown in the drawings, platform member 12 can be elongated and supported with three or more triangular braces 16 to form a bench-type step or support surface.

Even though the preferred materials of manufacture of platform member 12 and triangular braces 16 are comprised of various plastic compounds, other suitable materials, such as lightweight metals, can aso be used. Platform attachment hooks 14 currently require manufacture with metal materials due to the need for additional strength. Should an appropriately strong material other than metal be provided, substitution can be made.

Figure 14:
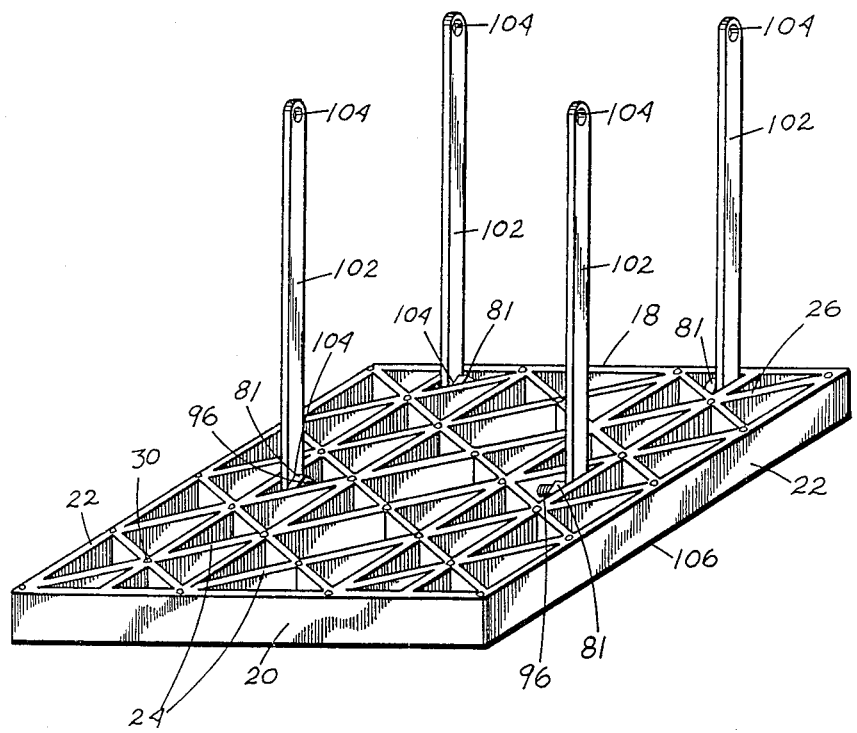
FIG. 14 is a perspective illustration of the lower or second platform member and attachment rods of the second embodiment.
Figure 15:
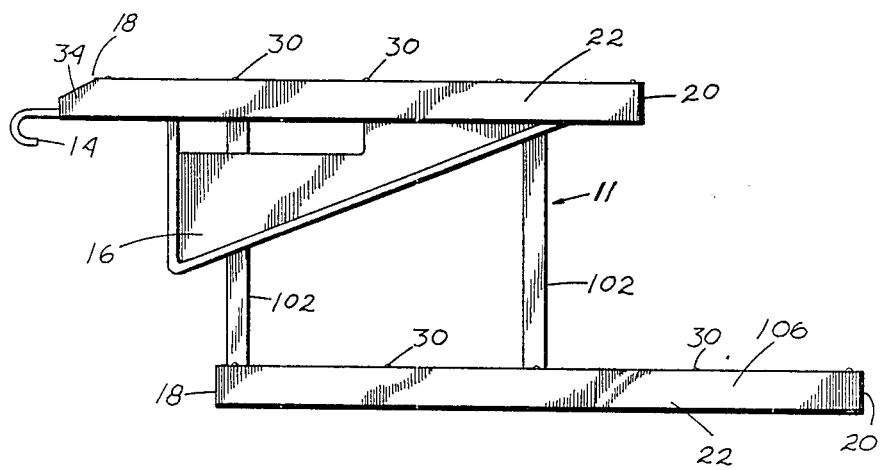
FIG. 15 is a left side view of the assembled second embodiment of the invention showing the two load support platform members or steps.

When using first embodiment 10 with high bumpers 35 or other high platform support members 108 as a step, it can sometimes be difficult and awkward for user 32 to get on top of platform member 12. Second embodiment 11 is designed for use under such conditions. Second embodiment 11 shown in an assembled side view in FIG. 15 is structured with a lower platform step 106 removably affixed to first embodiment 10. The upper section of second embodiment 11 is first embodiment 10 having platform member 12, replaceable hooks 14, and triangular braces 16 structured and used identically. Platform member 12 used in second embodiment 11 has one addition shown in FIG. 5. In grating 24 shown in FIG. 5 are four securely affixed metal or plastic threaded studs 96, two extending vertically inward from each of the two innermost brace retaining ridges 54. Threaded studs 96 are structured for removable attachment of four rigid metal or plastic vertical support rods 102. The upper ends of vertical support rods 102 have one vertical support rod aperture 104 each sized for placement over threaded studs 96 where vertical support rods 102 are secured with nuts 81. The lower ends of vertical support rods 102 also have vertical support rod apertures 104 for attachment over four threaded studs 96 with nuts 81 to a lower platform step 106 shown in FIG. 14. Lower platform step 106 is a rectangular platform having grating 24 and non-slip knobs 30 on top surface 26 between two side panels 22, a back end panel 20, and a bumper 35 facing front end panel 18. Lower platform step 106 when attached is positioned horizontally directly below and spaced from platform member 12 with approximately one-half of lower platform step 106 under, and one-half of lower platform step 106 extending beyond back end panel 20 of platform member 12 forming a step for use 32 to use to get on top of the upper platform member 12. Vertical support rods 102 are removably affixed to allow disassembly of second embodiment 11 for storage and to allow the upper structure, embodiment 10, to be use as a single lever hook-on platform. In FIG. 16 second embodiment 11 is shown being used as a two level step by user 32 attached to the channel iron framing of boat trailer 94. Also shown in FIG. 16 is first embodiment 10 being used a cargo carrier on the back of boat 92 with an ice chest secured with cargo tie-down straps 98.

Although I have described the preferred embodiment of my invention in detail in the specification, it is to be understood that I may practice modifications and alterations in the structure and design of the invention insofar as such changes remain within the intended scope of the appended claims.

What I claim as my invention is:

1. A vehicle service platform having interchangeable hooks with said hooks available in a number of different shapes and sizes to allow removable hook-on attachment of said service platform to various shapes and sizes of structures such as bumpers and framing members on a vehicle, comprising:

a primary platform member, said primary platform member being a rigid substantially rectangular structure having a top surface and an oppositely disposed bottom surface formed of grating opened through said top and said bottom surface, said grating adapted to prohibit puddling of water, said top surface of said primary platform having a plurality of extending knobs adapted to provide a non-slip surface, said primary platform member having a back end outer edge panel and an oppositely disposed front end outer edge panel attached to said grating, there being side outer edge panels extending between said back end outer edge panel and said front end outer edge panel attached to said grating, said primary platform member adapted for use with said top surface being a load bearing substantially horizontal non-slip surface;

at least two hook attachment brackets permanently affixed to said front end outer edge panel of said primary platform member adapted to provide attachment structure for said hooks;

at least two said hooks each having a bent end adapted to hook over a said structure of said vehicle, each said hook having an oppositely disposed substantially flat straight end adapted for removable attachment to a said hook attachment bracket;

means of removably attaching said straight end of said hooks to said hook attachment brackets one said hook to each hook attachment bracket;

at least two elongated brace retaining channels affixed on said bottom surface of said primary platform member, said brace retaining channels extending lengthwise between said front end outer edge panel and said back end outer edge panel, each said brace retaining channel structured of two spaced generally parallel ridges extending from said bottom surface of said primary platform member, there being an apertured plate ceiling recessed between each said two spaced ridges affixed to said bottom surface of said primary platform member, three being lock serrations formed on one of said plate ceiling and said ridges within each said brace retaining channel;

at least two generally triangular side braces, one said side brace for each said brace retaining channel, each said side brace having a first side edge adapted for tight fitting insertion between said two spaced ridges of one said brace retaining channel, said two spaced ridges adapted to provide lateral support to said tight fitting first side edge of said brace, said first side edge having serrations adapted for interlocking abutment with said lock serrations within said brace retaining channel with said interlocking abutment adapted to prohibit sliding of said brace in said brace retaining channel, said first side edge of said brace having a slotted aperture adapted to allow fastening of said first side edge of one said brace in one said brace retaining channel, said fastening including a bolt and nut through said slotted aperture of said brace and said apertured plate ceiling of said brace retaining channel to maintain a secure interlocking abutment of said serrations, said fastening of said brace to said primary platform member adapted to provide adjustable positioning of said brace towards and away from said front end edge panel of said primary platform member and said bent end of said hooks by loosing said bolt allowing said interlocked serrations to separate to provide said brace mobility in said brace retaining channel with said slotted aperture sliding over said bolt, each said brace having a second side edge extending away from aid first side edge at a generally perpendicular angle, said second side edge with said brace attached to said primary platform member being positioned toward said front end outer edge panel below said hooks and said bottom surface of said primary platform member, said second side edge adapted to brace against a generally vertical surface of said structure of said vehicle to support said primary platform member in said horizontal position, there being a third side edge of said triangular brace extending at an angle between said first side edge and said second side edge, said third side edge being attached to said first side edge and said second side edge adapted to add rigidity to said brace.

2. The vehicle service platform of claim 1 wherein said means for removably attaching said straight flat ends of said hooks to said hook attachment brackets is at least one bolt aperture in each said hook attachment bracket and at least one bolt aperture in each said straight flat end of said hook, there being a bolt passed through both said bolt apertures with said hook being further removably secured to said attachment bracket by a nut affixed to said bolt.

* * * * *